(12) United States Patent
Puigardeu Aramendia et al.

(10) Patent No.: US 9,906,686 B2
(45) Date of Patent: Feb. 27, 2018

(54) IMAGE PROCESSING USING CONTENT-BASED WEIGHTED DITHERING

(71) Applicant: Hewlett-Packard Development Company, L.P., Houston, TX (US)

(72) Inventors: Sergio Puigardeu Aramendia, Barcelona (ES); Angel Martinez Barambio, Barcelona (ES); Luis Garcia, Les Roquetes (ES); M. Isabel Borrell Bayona, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/028,891

(22) PCT Filed: Oct. 15, 2013

(86) PCT No.: PCT/EP2013/071556
§ 371 (c)(1),
(2) Date: Apr. 12, 2016

(87) PCT Pub. No.: WO2015/055235
PCT Pub. Date: Apr. 23, 2015

(65) Prior Publication Data
US 2016/0344895 A1    Nov. 24, 2016

(51) Int. Cl.
*H04N 1/405* (2006.01)
*G06K 15/02* (2006.01)

(52) U.S. Cl.
CPC ....... *H04N 1/4052* (2013.01); *G06K 15/1876* (2013.01); *G06K 15/1881* (2013.01)

(58) Field of Classification Search
CPC .................................................. H04N 1/4052
See application file for complete search history.

(56) References Cited

U.S. PATENT DOCUMENTS 5,245,678 A    9/1993    Eschbach et al.
5,438,634 A    8/1995    Kumagai
(Continued)

FOREIGN PATENT DOCUMENTS

EP    2485471    8/2012
JP    2009134410    6/2009

OTHER PUBLICATIONS

Funkhouser, T. "Image Quantization, Halftoning, and Dithering," Princeton University, Sep. 14, 2008, 12 pages. Available at: http://www.cs.princeton.edu/courses/archive/fall00/cs426/lectures/dither/dither.pdf.

(Continued)

*Primary Examiner* — Scott A Rogers
(74) *Attorney, Agent, or Firm* — HP Inc. Patent Department (57) ABSTRACT

Image processing transforms input multi-level image data into output image data having a smaller number of levels (the input and output image data represents images formed of cells). The image processing distributes quantization error of a target cell of the image to neighbor cells in proportions determined by a set of weights. The distribution excludes neighbor cells whose data level is less than a threshold value from receiving distributed quantization error, or allows just a fraction of the quantization error to be distributed to such neighbor cells.

19 Claims, 8 Drawing Sheets

(56) References Cited

U.S. PATENT DOCUMENTS

| | | | | |
|---|---|---|---|---|
| 5,509,085 A * | 4/1996 | Kakutani | ............ | H04N 1/52 347/43 |
| 5,768,432 A * | 6/1998 | Schweid | ............ | H04N 1/4053 358/3.03 |
| 5,822,464 A * | 10/1998 | Metcalfe | ............ | H04N 1/4053 358/3.03 |
| 5,835,687 A * | 11/1998 | Brown | ............ | H04N 1/4052 358/1.9 |
| 5,933,539 A * | 8/1999 | Metcalfe | ............ | H04N 1/4053 358/2.1 |
| 6,249,357 B1 * | 6/2001 | Metcalfe | ............ | H04N 1/4052 358/451 |
| 6,501,564 B1 * | 12/2002 | Schramm | ............ | H04N 1/52 358/1.9 |
| 6,603,575 B2 * | 8/2003 | Schweid | ............ | H04N 1/4052 358/1.2 |
| 7,081,972 B2 | 7/2006 | Fukao | | |
| 8,208,175 B2 | 6/2012 | Xu et al. | | |
| 8,351,083 B2 * | 1/2013 | Moribe | ............ | H04N 1/4053 358/3.03 |
| 2003/0072035 A1 | 4/2003 | Hagai et al. | | |
| 2007/0070424 A1 * | 3/2007 | Chiwata | ............ | B41J 2/04506 358/3.03 |
| 2009/0009779 A1 | 1/2009 | Do | | |

OTHER PUBLICATIONS

PCT Search Report and Written Opinion, dated Jun. 17, 2014, PCT/EP2013/071556, Hewlett-Packard Development Company, Ltd., European Patent Office, 21 pages.

* cited by examiner

| | 200 | 0 | 0 |
|---|---|---|---|
| 200 | 201 | 2 | 0 |
| 200 | 200 | 0 | 0 |
| 199 | 200 | 0 | 0 |

Im 0-51→0 dots [0]
52-102→1 dot [64]
103-153→2 dots [128]
154-204→3 dots [192]
205-255→4 dots [255]

| | 192 | 0 | 0 |
|---|---|---|---|
| 192 | 192 | 0 | 0 |
| 192 | 192 | 0 | 0 |
| 192 | 192 | 0 | 0 |

| | 200 | 0 | 0 |
|---|---|---|---|
| 200 | 201 | 2 | 0 |
| 200 | 200 | 0 | 0 |
| 199 | 200 | 0 | 0 |

$+\frac{3}{16}[8]$  $+\frac{5}{16}[8]$  $+\frac{1}{16}[8]$  $+\frac{7}{16}[8]$

| | 192 | | |
|---|---|---|---|
| | | | |
| | | | |
| | | | |

Error = 200 - 192
= +8

FIG.10B

| | 200 | 4 | 0 |
|---|---|---|---|
| 202 | 204 | 3 | 0 |
| 200 | 200 | 0 | 0 |
| 199 | 200 | 0 | 0 |

$+\frac{3}{16}[4]$  $+\frac{5}{16}[4]$  $+\frac{1}{16}[4]$  $+\frac{7}{16}[4]$

| | 192 | 0 | |
|---|---|---|---|
| | | | |
| | | | |
| | | | |

Error = 4 - 0
= +4

IMAGE PROCESSING USING CONTENT-BASED WEIGHTED DITHERING

CROSS-REFERENCE TO RELATED APPLICATION

This application is a U.S. National Stage Application of and claims priority to International Patent Application No. PCT/EP2013/071556, filed on Oct. 15, 2013, and entitled "IMAGE PROCESSING USING CONTENT-BASED WEIGHTED DITHERING," which is hereby incorporated by reference in its entirety.

BACKGROUND

In reprographic devices, e.g. ink jet printers and so forth, it is commonplace to apply half-toning to the image data that is to be reproduced. Half-toning is a reprographic technique in which a continuous tone image (contone image) is represented using dots, notably using dots in cells, each cell representing a small region of the image. The number of dots used in a cell is varied depending on the content of the contone image so that different densities in the contone image can be represented, notably by using different numbers of dots in the cells of the reproduction image. Instead of using different numbers of dots in a cell, half-toning may use dots of differing sizes to allow different intensities in the contone image to be represented.

Typically the number of different values that can be represented by the dots in the cells of the reproduction image is much smaller than the number of different densities that may be present in the contone data. For example, nowadays typical print data is represented using 8-bits-per-pixel and the half-toning process may determine whether to fire ink (binary "1" level) or not to fire ink (binary "0" level) for a cell in the printed image that represents a given pixel in the input image data (so only two different density levels can be represented in the half-toned image, or "reproduction image"). In other cases plural ink drops may be fired for a single cell in the printed image: for example, 0 to 4 ink drops may be fired for each cell, allowing 5 different density levels to be represented in the reproduction image. Nevertheless, because the number of levels used to represent cells of the reproduction image is much less than the number of bits-per-pixel used to represent cells/pixels in the input image data, the density level assigned to a cell of the reproduction image will tend to depart from the true value of the density of the image at this location in the input image.

So, the half-toning process produces errors in the reproduction image, that is, the reproduction image is not totally faithful to the original contone image. The difference between the density at a particular region in the contone image and the density of the corresponding cell in the reproduction image is often termed quantization error.

Nowadays it is customary for reprographic devices to have a special black path, that is, to process image data relating to black lines in a separate processing pipeline from other image data, notably so that the black line data is not subjected to half-toning. The image data that is not processed in the special black path is still subjected to half-toning.

It is usual to design the half-toning process that is applied to the image data outside the special black path in a manner that will enhance the uniformity of area fills. This is because the most visible quality defects in a reproduction image tend to be non-uniformities in area fills.

BRIEF DESCRIPTION OF THE DRAWINGS

Image processing methods and devices according to some examples of the invention will now be described, by way of illustration only, with reference to the accompanying drawings.

DESCRIPTION OF IMAGE PROCESSING METHODS AND DEVICES ACCORDING TO EXAMPLES OF THE INVENTION

Certain example implementations of the invention will now be described in the context of the application, within a printer, of image processing methods and devices that implement error diffusion dithering. However, it is to be understood that image processing methods and devices according to the invention are not limited to application in printers.

Half-toning processes that are designed to improve the uniformity of area fills tend to include an error diffusion dithering process. In error diffusion dithering the quantization error that is calculated for a given target cell in the image is distributed over one or more cells in the neighborhood of the target cell. This tends to smooth color transitions and improve uniformity of area fills.

For example, consider an ink jet printer receiving an input image represented using 8 bit data (such that density levels from 0 to 255 may be represented) and employing a half-toning process in which, for each cell of the reproduction image, a decision must be taken whether to fire an ink drop or not to fire an ink drop. Typically, for density levels in the range 0-127 in the input image no ink drop will be fired but for density levels 128-255 in the input image an ink drop will be fired. Strictly speaking, in this example an ink dot in the reproduction image corresponds to black, i.e. a 255 level in the input image, and the absence of a dot in the reproduction image corresponds to white and represents a 0 level in the input image (assuming printing on a white medium).

In this scenario, consider now the case of a region having a mid-grey level in the input image, represented by a value of 140. When a first cell in this mid-grey region is being half-toned a decision is made, for example, to create an ink dot but, in effect, the ink dot corresponds to a black level 255, thus there is an error of 140-255. If the subsequent cell in this mid-grey region, also having a level of 140, were also to produce an ink dot in the half-toning process then more ink than is needed would be fired overall in this region. Thus, when considering how to half-tone the second cell (and subsequent cells in the image) it may be appropriate to take into account the half-toning decisions that have been made for the previous cells, notably in cases where the image data includes an area fill.

Figure 9:
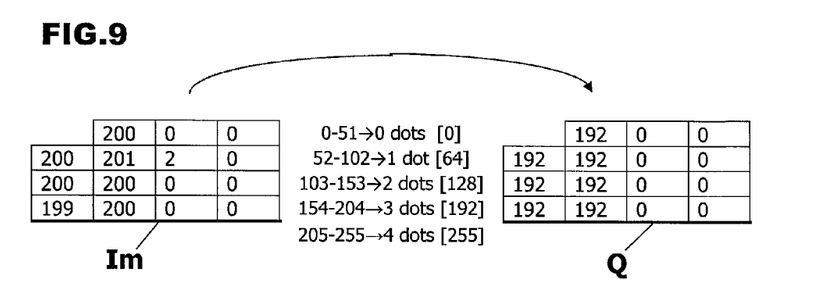
FIG. 9 is a diagram illustrating an image processing method involving quantization of image data without error diffusion.

FIG. 9 illustrates an example of an image processing method in which no account is taken of quantization error. FIG. 9 shows an example of image data Im relating to a group of 15 neighboring pixels. It can be seen that the pixels in the image data Im fall into two groups corresponding to two adjacent regions having different densities. The 7 left-hand pixels have densities that correspond to a mid-grey level but the 8 right-hand pixels have effectively no content (zero or white level).

According to the example of FIG. 9, the image data Im is quantized to produce reproduction image data Q in a quantization process which assigns zero dots to a cell in the reproduction image which represents a pixel in the input image having a density in the range 0-51; in effect the output zero dots per cell represents a level of 0. One dot is assigned to a cell in the reproduction image which represents a pixel in the input image having a density in the range 52-102; in effect the output one dot per cell represents a level of 64. Two dots are assigned to a cell in the reproduction image which represents a pixel in the input image having a density in the range 103-153; in effect representing a level of 128. Three dots are assigned to a cell in the reproduction image which represents a pixel in the input image having a density in the range 154-204; in effect representing a level of 192. Four dots are assigned to a cell in the reproduction image which represents a pixel in the input image having a density in the range 205-255; in effect representing a level of 255.

It can be seen from FIG. 9 that the example image processing method which does not take quantization error into account produces reproduction image data Q which still represents two adjacent regions having different densities, but the density of the mid-grey region at the left (corresponding to a level of 192) is lighter than in the original image (which, on average, corresponded to a level of 200).

Different techniques are known for determining how quantization error may be distributed to neighbor cells of a target cell, notably for deciding how much of the quantization error to apply to which neighbor cell.

Figure 1A:
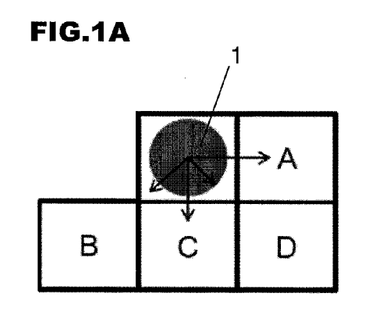
FIG. 1A is a diagram illustrating an example of an error diffusion dithering process.

FIG. 1A illustrates one example of how, in an error diffusion dithering process, quantization error may be distributed to cells neighboring a target cell. According to the example of FIG. 1A, the half-toning image processing proceeds from left-to-right in the figure and from top to bottom. The quantization error calculated in respect of a target cell 1 is distributed to four cells, A, B, C and D that have yet to be processed. In this example the neighbor cells to which the error is distributed are some of the nearest neighbors of the target cell: cell A is the next cell in the same line as target cell 1, and neighbor cells B to D are the nearest neighbors to the target cell 1 in the next line in the image (with the "next" cell or line meaning the one that is "next" in the scan direction).

Figure 1B:
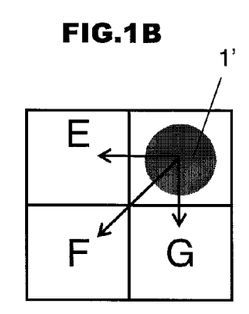
FIG. 1B is a diagram illustrating another example of an error diffusion dithering process.

The amount of the quantization error of target cell 1 that is distributed to each of the neighbor cells A to D may be determined in various ways, one of which is by assigning weights for different neighbor cells depending on the relative positions of the neighbor cells to the target cell in the scan direction, and distributing error to the neighbor cells in proportions that depend on the assigned weights. When the error-distribution weights are set according to the Floyd-Steinberg algorithm then the quantization error of target cell 1 may be distributed to neighbor cells A to D in the scan direction according to weighting coefficients that add up to 1.0. For example, one example Floyd-Steinberg weighting distribution is, as follows:

Cell A receives 7/16 of the quantization error
Cell B receives 3/16 of the quantization error
Cell C receives 5/16 of the quantization error
Cell D receives 1/16 of the quantization error FIG. 1B illustrates another example of how, in a Floyd-Steinberg error diffusion dithering process, quantization error may be distributed to cells neighboring a target cell. According to the example of FIG. 1B, the half-toning image processing proceeds from right-to-left in the figure and from top to bottom, and weighting coefficients are specified for neighbor pixels E, F and G to a target pixel 1'. For example: cell E may be assigned a weighting coefficient of 3/8 (such that it will receive 3/8 of the quantization error of target cell 1'), cell F may be assigned a weighting coefficient of 1/4 (such that it will receive 1/4 of the quantization error of target cell 1') and cell G may be assigned a weighting coefficient of 3/8 (such that it will receive 3/8 of the quantization error of target cell 1').

Other weighting distributions according to the Floyd-Steinberg algorithm, different from the example mentioned above, may be used (i.e. distributions specifying different weighting coefficient values and/or specifying different sets of cell positions to receive error).

Other weighted distributions different from the Floyd-Steinberg algorithm may be used. However, use of the Floyd-Steinberg algorithm is widespread because the error-distribution weights used in this algorithm have been found to minimize area fill artifacts. It will be understood that Floyd-Steinberg error diffusion dithering is a kind of location-based weighting scheme, where the weighting coefficient applied in respect of a neighbor pixel depends only on the location of that neighbor pixel relative to the target pixel in the scan direction.

Figure 2:
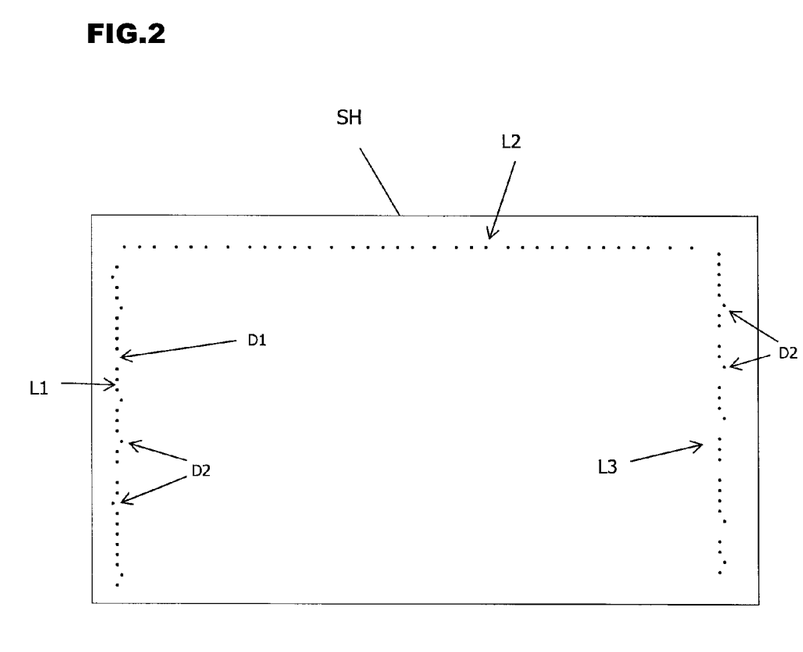
FIG. 2 illustrates an example of a printed image produced by a half-toning process using error diffusion dithering as in FIG. 1.

When half-toning including an error diffusion technique of the foregoing type is applied to image data including lines various defects may be observed in lines as they appear in the reproduction image. FIG. 2 illustrates some different types of defects that may arise.

FIG. 2 represents a recording medium SH carrying a printed image that was produced by half-toning an input image made up of three lines L1, L2 and L3, each one cell wide, in a half-toning process that involved Floyd-Steinberg error diffusion dithering. As illustrated in FIG. 2, in the line L2 that is shown to extend horizontally the spacing between the dots making up line L2 is irregular even though the spacing is uniform in the input image. In the lines L1 and L3 shown extending vertically in FIG. 2 there are discontinuities in the lines (indicated at D1) and misalignment of some dots forming the lines (indicated at D2) even though these lines were continuous straight liens in the input image. Thus, it will be understood that application of half-toning image processing including error diffusion dithering can lead to loss of sharpness of thin lines, for example lines having a thickness is the range of 1 to 4 pixels in the input image (at the resolutions applicable in printers nowadays).

The origin of the defects in lines in the reproduction image will now be explained with reference to FIG. 3 which illustrates the result of a half-toning process that includes error diffusion dithering according to the Floyd-Steinberg algorithm, and with reference to FIGS. 10A and 10B which illustrate how such an algorithm may transform some example input image data.

Figure 3:
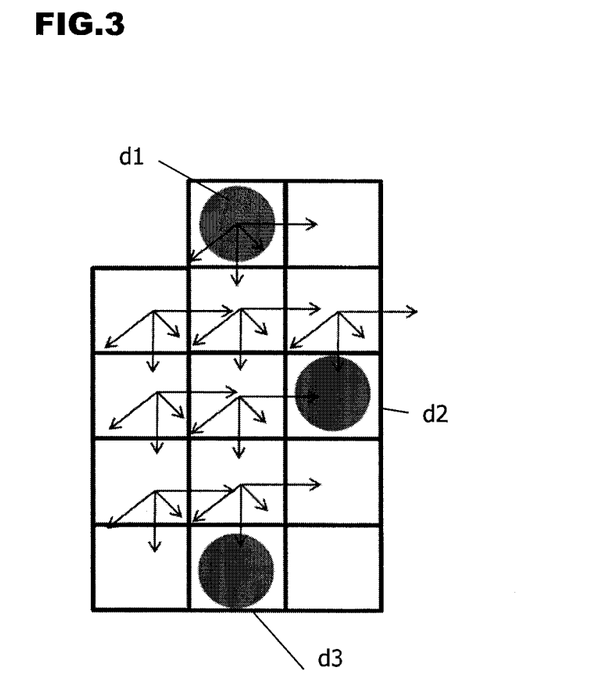
FIG. 3 illustrates how the error diffusion dithering process according to the example of FIG. 1 may produce a misalignment error in an image region representing a line.

The arrows in FIG. 3 illustrate how, when the Floyd-Steinberg error-diffusion dithering algorithm is applied, quantization error of target cells is diffused to all of the neighbor cells at four selected locations relative to each target cell. In the example illustrated in FIG. 3, this manner of diffusing quantization error leads to a dot d2 being positioned in the output (reproduction) image at a location that is out of alignment compared to other dots, d1 and d3, in the same line.

Figure 10A:
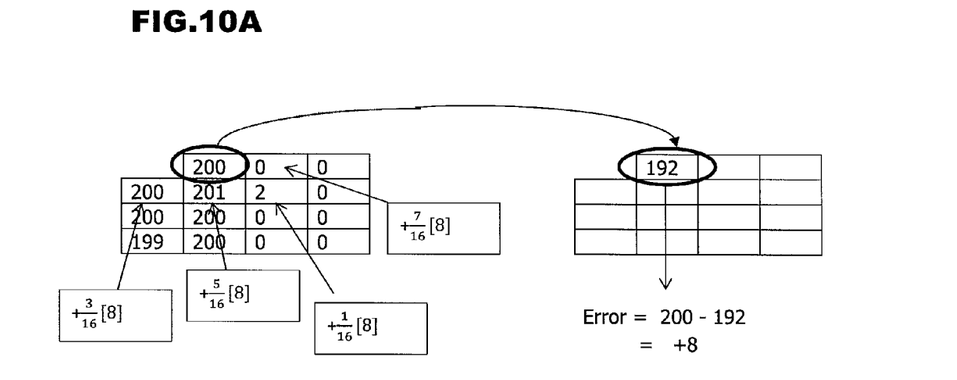
FIGS. 10A and 10B are diagrams illustrating an image processing method involving quantization with an example of Floyd-Steinberg error diffusion.
Figure 10B:
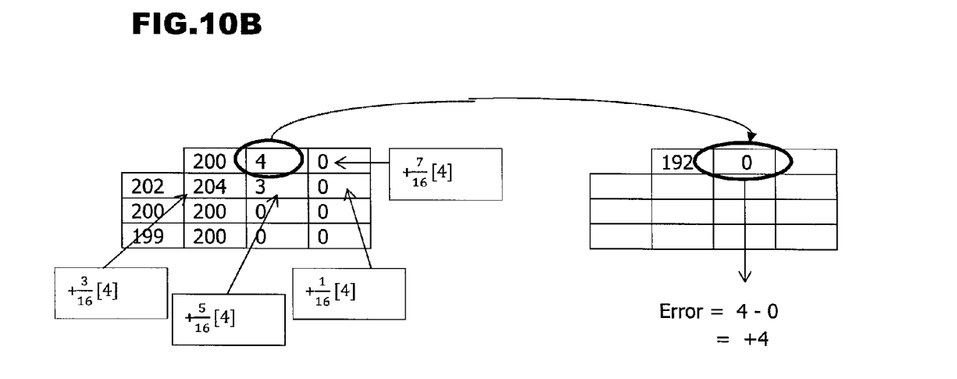

FIGS. 10A and 10B illustrates an example of an image processing method in which quantization and Floyd-Steinberg error diffusion are applied to the same image data Im as in the example of FIG. 9. In the example of FIGS. 10A and 10B, quantization error is distributed to neighbor pixels in the locations A-D illustrated in FIG. 1A using weighting coefficients $7/16$ for cell A, $3/16$ for cell B, $5/16$ for cell C and $1/16$ for cell D.

FIG. 10A illustrates the process of quantizing the top left-hand pixel in the image data, which has a density of 200 in the input image data Im. The quantizing process assigns three dots to the cell in the reproduction image that represents this input pixel, which corresponds to a density of 192 in the output data. The quantization error is thus 200-192, i.e. +8. This quantization error is distributed to neighbor cells and increases the levels assigned to all the neighbor pixels at the positions A to D relative to the target pixel. For example, the pixel to the right of the target pixel in FIG. 10a (at position A) is incremented by $8 \times 7/16$, yielding a changed value of 4. The image processing now moves one pixel to the right.

FIG. 10B illustrates the process of quantizing the next target pixel in the input image data (assuming that the error distribution illustrated in FIG. 10A has been implemented). It can be seen from the left-hand portion of FIG. 10B that the density of the now-target pixel has become 4, which is different from in the input image. This pixel is assigned zero dots in the reproduction image—which is appropriate in view of the actual value of this pixel in the input image in the present case—but a quantization error is computed and distributed to the neighboring pixels. In more extreme cases the error distributed to a pixel in the input image that is supposed to have a zero level can be so great that this pixel is represented using a non-zero value for the corresponding cell in the reproduction image.

An image processing method according to an example implementation of the invention will now be described with reference to the flow diagram of FIG. 4.

In the image processing method according to the present example implementation, a half-toning process is implemented which includes an error diffusion dithering process in which quantization error is distributed according to a location-based weighting scheme that is adjusted so that error is distributed only among neighbor cells that contain image information. Thus, as illustrated in FIG. 4, the present example image processing method includes a step S401 of quantizing input image data, a step S402 of evaluating the quantization error of target cells in the image, and a step S403 of distributing quantization error of target cells only to neighbor cells which contain image information.

Unlike traditional error diffusion dithering, in the present example image processing method quantization errors are no longer distributed to all of a selected set of neighbor cell locations irrespective of the image content of those cells; instead quantization error is only diffused to neighbor cells of the selected set of locations whose image content is non-zero (or greater than a selected threshold level). When the input image data represents a line, this example method has the benefit of propagating information only in the direction in which the line extends, and thus preserves line sharpness and continuity to a large degree both for horizontal and vertical lines.

The quantization error for a target cell may be distributed to the selected neighbor cells in various ways. One technique consists in adding the error portion that is distributed to a given neighbor cell to the image data of that neighbor cell. A given cell may have error portions distributed to it from plural target cells for which it is a neighbor.

An image processing method according to another example implementation of the invention will now be described with reference to the flow diagram of FIG. 5.

Figure 4:
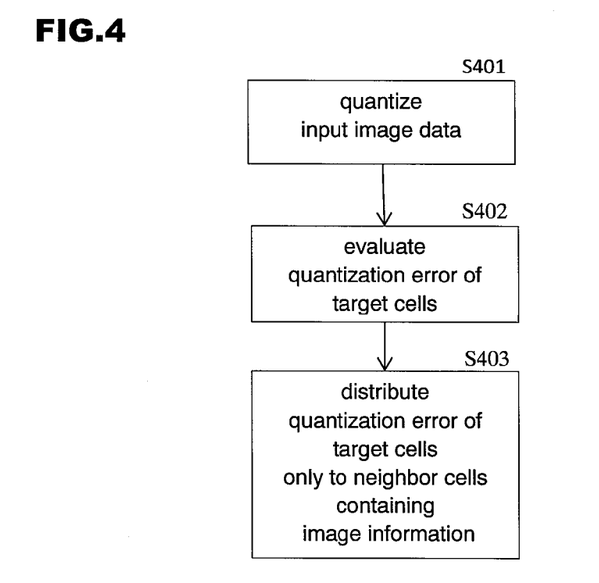
FIG. 4 is a flow diagram indicating steps in an image processing method according to an example of the invention.
Figure 5:
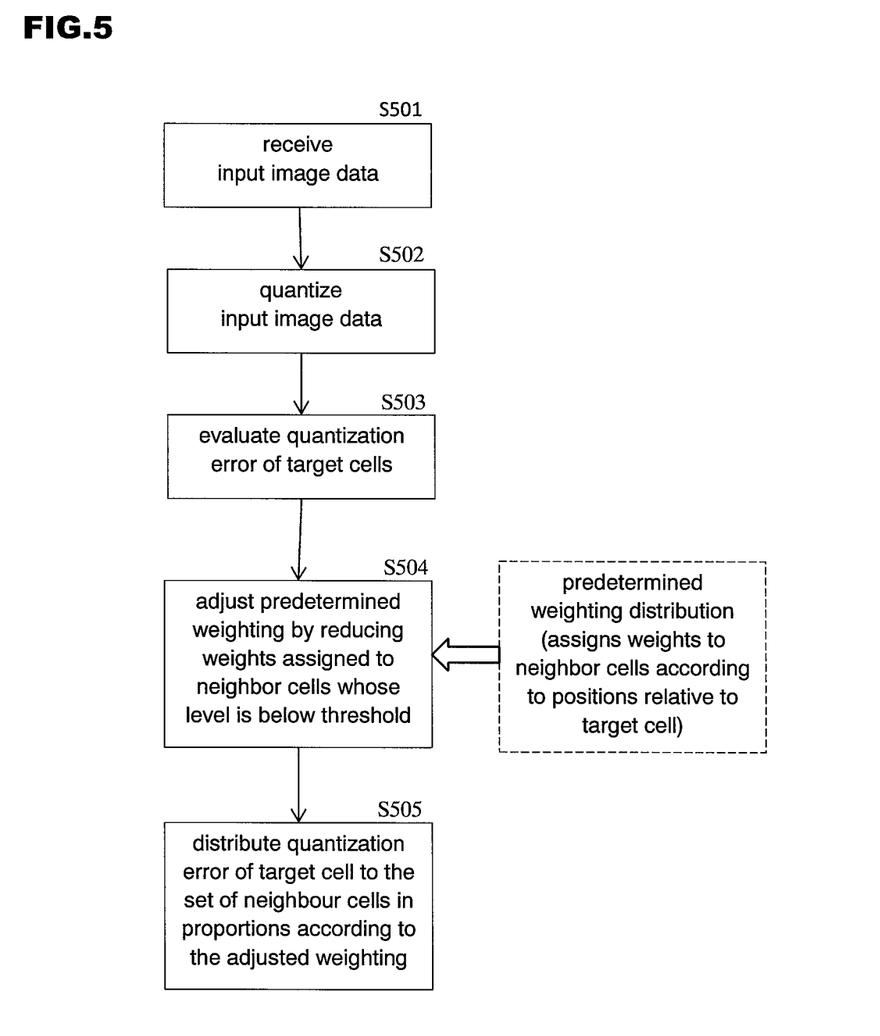
FIG. 5 is a flow diagram indicating steps in an image processing method according to an example of the invention.

As for the example of FIG. 4, in the image processing method according to the example implementation of FIG. 5 image processing is implemented which includes a content-based weighted error diffusion dithering process. In the case of FIG. 5, quantization error is distributed only among neighbor cells whose image data has a level greater than a specified threshold value.

As illustrated in FIG. 5, the present example image processing method includes a step S401 of receiving input image data, notably multi-valued image data. Typically the input image data is contone data that is to be subjected to a half-toning process. Such contone data may exclude black image data which is being processed in a special back path. The method also includes a step S502 of quantizing the input image data by reference to which of one or more quantization levels is the highest level that is exceeded by the input data level.

The image processing method of FIG. 5 includes a step S503 of evaluating the quantization error of target cells in the image. This evaluating may be performed by comparing the value of the input image data before and after quantizing, for example by subtracting a quantized cell value from the cell's value before quantization.

The image processing method of FIG. 5 makes use of a predetermined weighting distribution as a preliminary assignment of weights for the distribution of quantization error of a target cell to other cells in the image. This preliminary assignment of weights is adjusted in a step S514 of the image processing method of FIG. 5, as shall be discussed below.

In the example of FIG. 5 the predetermined weighting distribution assigns weights to a set of neighbor cells in the vicinity of a target cell according to the positions of the neighbor cells relative to the target cell. In one implementation of the image processing method of FIG. 5, the predetermined weighting distribution is a pattern of weights matching those of the Floyd-Steinberg distribution. Thus, in the latter implementation the predetermined weighting distribution assigns a weight of $7/16$ to the next neighbor cell in the same line as the target cell (cell A in FIG. 1), assigns a weight of $3/16$ to a neighbor cell in the next line but at an earlier position in that line than the target cell (cell B in FIG. 1), assigns a weight of $5/16$ to a neighbor cell in the next line and at the same position within its line as the target cell (cell C in FIG. 1), and assigns a weight of 1/16 to a neighbor cell in the next line but at a later position in that line than the target cell (cell D in FIG. 1).

It will be seen that the predetermined weighting distribution used in the example of FIG. 5 does not assign weights to all of the nearest neighbors of the target cell; it only assigns weights to the nearest neighbors that have not yet been half-toned. Different weighting distributions may be used as the predetermined weighting distribution of FIG. 5, including distributions which assign weights to one or more cells which are in the vicinity of the target cell but which are not its nearest neighbors.

As mentioned above, the predetermined weighting distribution is adjusted at step S504 of the method of FIG. 5. More particularly, the predetermined weighting distribution is adjusted to reduce the weights that are assigned to neighbor cells that are covered by the distribution but which, in effect, contain no information (i.e. they have a data level that is zero or a low level). Typically neighbor cells having zero or low level data are identified by comparing the level of their data against a threshold level. The threshold level may be set in any convenient manner. However, in certain examples involving processing of 8-bit input image data it has been found to be appropriate to set the threshold level to a value of approximately 16.

In step S504 of FIG. 5 weights may be reduced in various ways. In one implementation, the weight $w_k$ for a neighbor cell k that has a zero or low data level is adjusted to zero.

In one particular implementation of step S504 of FIG. 5, weights according to the Floyd-Steinberg algorithm are adjusted to zero for neighbor cells which have no image content. So, for example, in a case where no information is present at cell B in FIG. 1 (e.g. because the data level for cell B is equal to or close to zero), but information is present at cells A, C and D, then in step S504 according to this implementation the weights applied to the neighbor cells A to D are set, as follows:

Cell A receives wa/wt of the quantization error, where wa is 7

Cell B receives wb/wt of the quantization error, where wb is zero

Cell C receives wc/wt of the quantization error, where wc is 5

Cell D receives wd/wt of the quantization error, where wd is 1 and wt=$\Sigma_i w_i$ which, in this example, is 13.

In the present example case where no information is present at cell B in FIG. 1 but information is present at cells A, C and D, Table 1 below summarizes the weights that are assigned to cells A to D by the traditional Floyd-Steinberg algorithm and the adjusted weights that are assigned according to the above-mentioned particular implementation of step S504 of FIG. 5.

TABLE 1

| Cell | Weights according to the traditional Floyd-Steinberg algorithm | Adjusted Weights according to the example implementation of step S504 of FIG. 5 |
|---|---|---|
| A | 7/16 | 7/13 |
| B | 3/16 | 0 |
| C | 5/16 | 5/13 |
| D | 1/16 | 1/13 |

This set of adjusted weights forces the half-toning error to be propagated only to those cells which contain image information. If all of the cells A to D contain image information then the weights according to the predetermined weighting distribution (e.g. Floyd-Steinberg algorithm) are not adjusted.

In step S505 of FIG. 5 quantization error (half-toning error) of a target cell is distributed to the relevant neighbor cells in proportions set by the adjusted weights.

Figure 8:
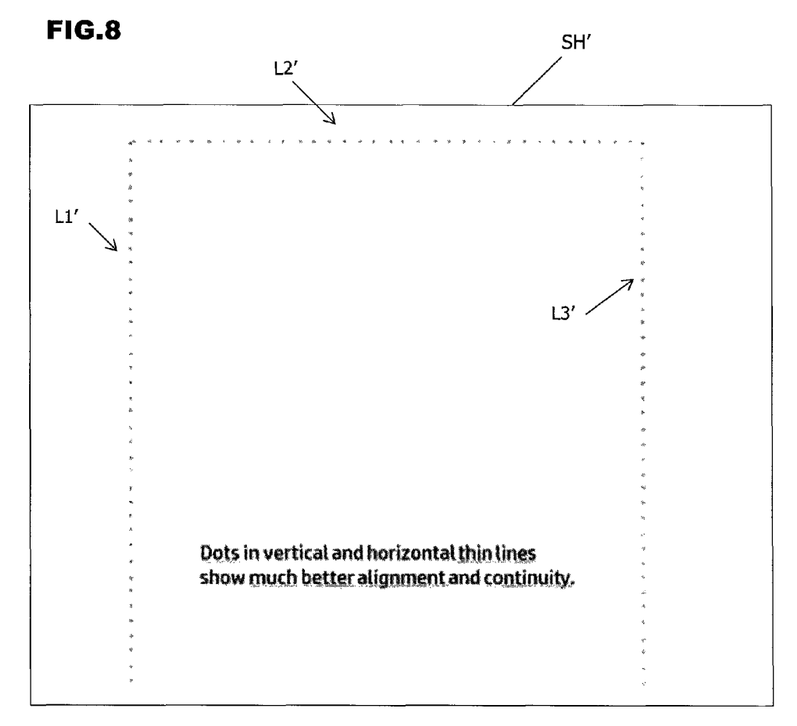
FIG. 8 illustrates an example of a printed image produced using an image processing method according to an example of the invention.

FIG. 8 represents a recording medium SH' carrying a printed image that was produced by half-toning an input image made up of three color lines L1', L2' and L3', in a half-toning process performed by implementing the method of FIG. 5 using the Floyd-Steinberg error diffusion weights as the predetermined weighting distribution and adjusting the weights to zero for neighbor cells containing no information.

A comparison of FIG. 8 with FIG. 2 shows that both horizontal and vertical grey lines show a much better alignment and continuity in the half-toned image produced by this implementation of the FIG. 5 method. Line sharpness is improved.

Figure 11A:
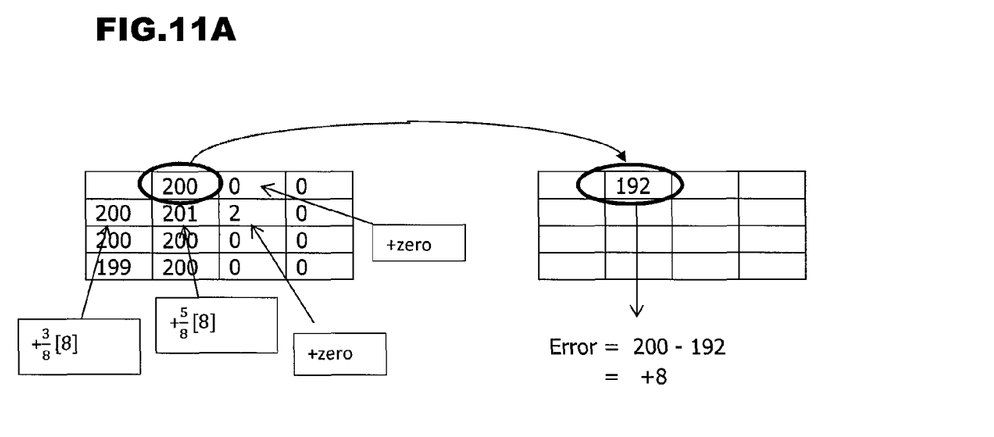
FIGS. 11A and 11B are diagrams illustrating an image processing method according to an example of the invention involving quantization and error diffusion employing content-based weighting.
Figure 11B:
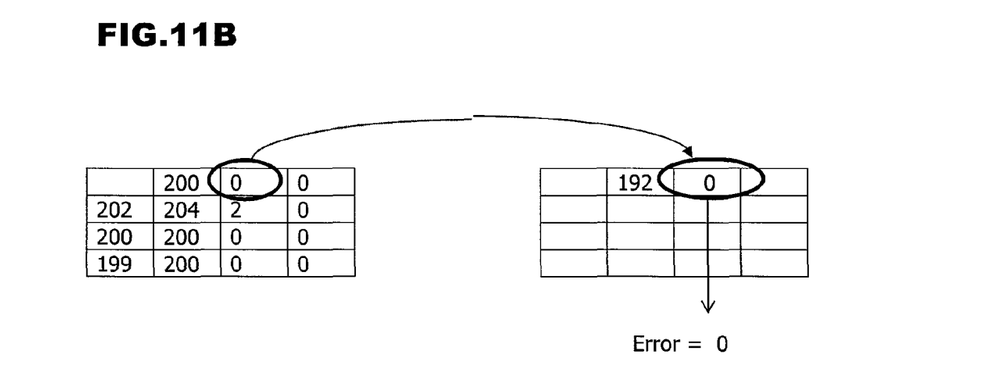

FIGS. 11A and 11B help to illustrate the above-mentioned improvement.

FIGS. 11A and 11B illustrate an example of an image processing method based on that of FIG. 5 applied to the same image data Im as in the example of FIG. 9. In the example of FIGS. 11A and 11B, quantization error is distributed to those of the neighbor pixels in the locations A-D illustrated in FIG. 1A which have non-zero content (in this case, which have a density of at least 16).

FIG. 11A illustrates the process of quantizing the top left-hand pixel in the image data, which has a density of 200 in the input image data. The quantizing process assigns three dots to the cell in the reproduction image that represents this input pixel, which corresponds to a density of 192 in the output data. The quantization error is thus 200−192, i.e. +8. This quantization error is distributed to those of the neighbor cells A to D whose density is no less than 16 which, in this case, means that no error is distributed to the neighbor pixels at locations A and D relative to the target pixel. The weighting coefficients applied to the pixels at locations B and C are adjusted to 3/8 and 5/8 respectively.

FIG. 11B illustrates the process of quantizing the next target pixel in the input image data (assuming that the error distribution illustrated in FIG. 11A has been implemented). It can be seen from the left-hand portion of FIG. 11B that the density of the now-target pixel has not been changed from its initial value of 0. This pixel is assigned zero dots in the reproduction image—which is appropriate in view of the actual value of this pixel in the input image in the present case and no quantization error is distributed to the neighboring pixels. Thus, it can be seen from FIGS. 11A and 11B that no error is inappropriately added to the pixels which had zero (or negligible) content in the input image.

In the example methods illustrated by FIG. 4 and FIG. 5, quantization errors of target pixels are distributed to neighbor pixels at a set of locations designated in a predetermined location-based weighting scheme, but only to the pixels in the set that have non-negligible content (i.e. which a density level greater than a specified threshold level). However, the invention is not limited to this case. In certain other example methods the component of quantization error that is distributed to a neighbor pixel that has negligible content is reduced compared to the proportion that is designated by the predetermined location-based weighting scheme, but it is not reduced all the way down to zero.

Thus, in one example method, a fraction of the quantization error is reserved, for example 10% of the quantization error. The remaining (non-reserved) quantization error is distributed among only those neighbor pixels that are designated in a predetermined weighting scheme and that have non-negligible content. However, the reserved fraction of quantization error is distributed to the neighbor pixels that have zero (or negligible) content, so as to randomize the half-tone to a small extent. The percentage of quantization error that is reserved is not limited to 10%; other values may be chosen (e.g. 15%, 20%, and others). In some applications, the fraction of quantization error that is reserved for distribution to the pixels that contain no or negligible content may be a parameter that is configurable by the user.

It is believed that certain implementations of the image processing methods described here are the only methods by which it may be possible to achieve quasi-perfect alignment of dots defining thin color lines (i.e. alignment that looks perfect even when thin color lines in the reproduction image are examined using a magnifying glass) in cases where the black data is processed in a separate black path and error-diffusion is applied to the other data. Thus, in such cases quasi-perfect dot alignment in thin color lines in a reproduction image is a sign that a method according to the invention has been used in half-toning the image.

Image processing methods that are examples of the invention are not limited to application in an image data path that contains the colors other than black. These new methods may be applied just in a special black path, or in all the image data paths (all the color planes), or in a selected sub-set of paths (relating to selected color planes), and here references to the "color planes" include black. The choice of particular color planes in which the methods are applied does, of course, also depend on the color space used to represent the image data (CMYK, RGB, C-lightC-M-lightM-Y-K, and so on).

Image processing methods implementing FIGS. 4 and 5 have the benefit of being straightforward to implement, without a need for complicated or bulky components. Furthermore, although these methods involve calculation of error diffusion weights for each image cell, the calculation of weights is so simple that no extra processing power is required beyond that already used for implementing other error diffusion dithering processes.

Some examples of image processing devices that may be used to implement methods according to examples of the invention will now be described with reference to FIGS. 6 and 7.

Figure 6:
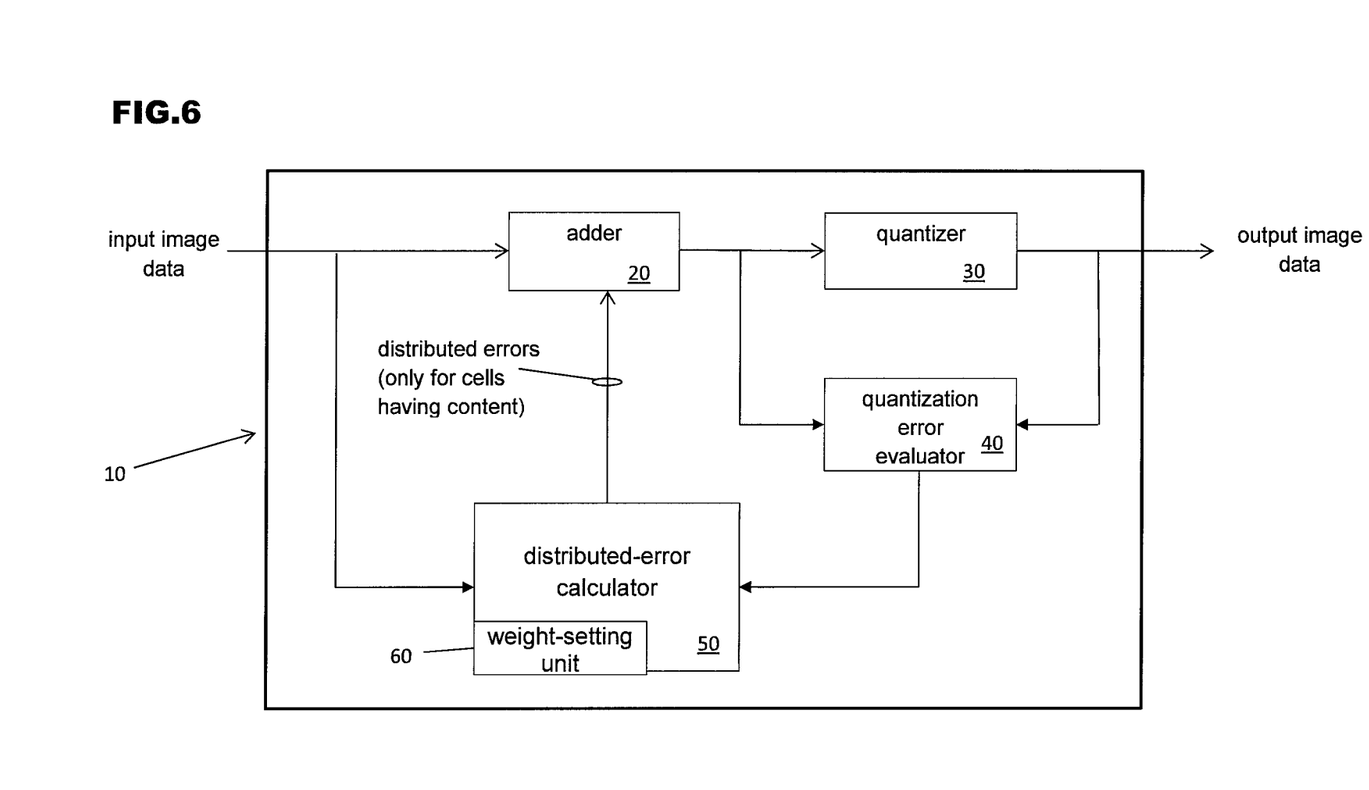
FIG. 6 is a block diagram indicating components in an image processor method according to an example of the invention.

FIG. 6 illustrates one example image processing device 10 which comprises an adder 20, a quantizer 30, a quantization error evaluator 40 and a distributed-error calculator 50. The distributed-error calculator 50 includes a weight-setting unit 60.

In the image processing device 10 of FIG. 6 input image data to be processed is supplied to the adder 20. The adder 20 adds errors distributed from other cells to the image data of a given input image cell provided that this input image cell contains information (i.e. provided that its data level is non-zero and/or greater than or equal to a threshold level). The output from the adder 20 corresponds to a modified version of the relevant input image cell. This modified version of the input image cell is supplied to the quantizer 30 and to the quantization error evaluator 40. The quantizer quantizes (half-tones) the target cell by comparing the data level of the target cell relative to one or more quantization levels and outputs the quantized value. This quantized value is output as an output image cell. The quantized value is also supplied to the quantization error evaluator 40 which compares it to the pre-quantization value to determine the error introduced by the quantization process. The computed error is supplied to the distributed-error calculator 50.

The distributed-error calculator 50 determines how to distribute the quantization error applicable to a given target cell to other cells in the vicinity of the target cell and, in this example, the distributed-error calculator 50 distributes the quantization error in proportions set by weights supplied by the weight-setting unit 60. In this example the distributed-error calculator 50 accumulates the error components that are distributed to a given cell from other target cells and, when this cell becomes the target cell, outputs the accumulated error to the adder 20 so that the relevant cell can be modified by an amount that corresponds to the accumulated error.

In this example, the weight-setting unit 60 sets weights, to be used for distributing the quantization error applicable to a target cell to a set of neighbor cells, with reference to a predetermined weighting distribution and with reference to the content of the neighbor cells. In one implementation, the predetermined weighting distribution assigns predetermined weights according to the position of each neighbor cell in the set relative to the target cell and, if a neighbor cell contains no information (e.g. its data level is zero), the weight for this neighbor cell is adjusted to zero.

In the case of a cell which contains no image information (or a below-threshold data level), whenever this cell corresponds to a neighbor cell that is a candidate to receive quantization error distributed from a target cell the weight-setting unit 60 sets a zero weight and so no error is distributed to this cell. Accordingly, when this cell becomes the target cell and is supplied to the adder 20, there are zero accumulated error components distributed to this cell by the distributed-error calculator 50. As a consequence, the adder 20 does not modify the data value for this cell. So, in this implementation, the image processing device 10 of FIG. 6 only distributes quantization error to cells which have image content. Thus, in the case of a color line in the input image, quantization error is only propagated in the line direction.

Figure 7:
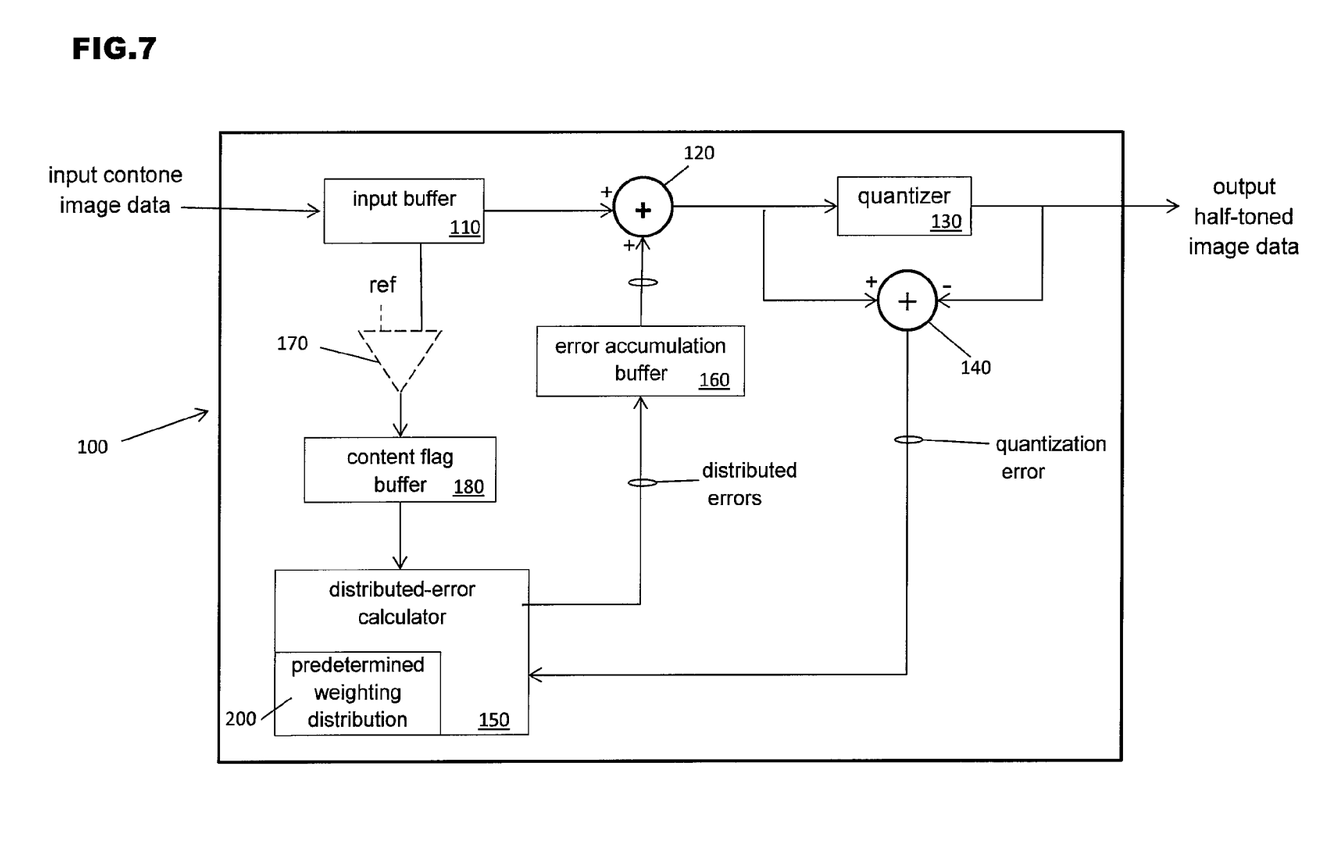
FIG. 7 is a block diagram indicating components in an image processor method according to an example of the invention.

FIG. 7 illustrates another example image processing device 100. The image processing device 100 comprises an input buffer 110, an adder 120, a quantizer 130, an adder 140 arranged to perform a subtraction, a distributed-error calculator 150, a comparator 170, and a content flag buffer 180. During operation the distributed-error calculator 150 refers to a predetermined weighting distribution 200. Details of the predetermined weighting distribution 200 may be provided to the distributed-error calculator in different ways. For example, details of the predetermined weighting distribution may be held as information in a register or memory (either local to or remote from but accessible to the distributed-error calculator 150). As another example, the details may be hard-wired into a filter structure having coefficients that correspond to weights and delay lines which ensure that the weights are applied to cells at desired locations relative to a target cell, and so on.

In the image processing device 100 of FIG. 7 input image data to be processed is supplied to the input buffer 110. Image data relating to cells in the input image data is supplied from the input buffer 110 to the comparator 170 where it is compared with a threshold level, designated ref in FIG. 7, in order to determine whether or not the cell in question contains image information. The result of the comparison is stored as a content flag for the cell in question in the content flag buffer 180. Thus, the content flags held in the content flag buffer 180 indicate whether or not cells lack image information (e.g. have a data level that is zero, or less than a threshold value).

Image data is output from the input buffer 110 and supplied to an adder 120. The adder 120 adds errors distributed from other cells to the image data of a given input image cell provided that this input image cell contains information (i.e. provided that its data level is non-zero and/or greater than or equal to a threshold level). The output from the adder 120 corresponds to a modified version of the relevant input image cell. This modified version of the input image cell is supplied to the quantizer 130 and to the subtractive adder 140. The quantizer quantizes (half-tones) the target cell by comparing the data level of the target cell relative to one or more quantization levels and outputs the quantized value. This quantized value is output as an output image cell. The quantized value is also supplied to the subtractive adder 140. The subtractive adder 140 subtracts the quantized cell value from the pre-quantization value and outputs a quantization error for the target cell in question. The quantization errors output by the subtractive adder 140 are supplied to the distributed-error calculator 150.

In the example illustrated in FIG. 7, the distributed-error calculator 150 determines how to distribute the quantization error applicable to a given target cell to other cells in the vicinity of the target cell and, in this implementation, the distributed-error calculator 150 distributes the quantization error to the neighbor cells according to an adjusted version of a predetermined weighting distribution 200.

In this example, when a neighbor cell contains no image information then the distributed-error calculator 150 adjusts the weight assigned to that neighbor cell by the predetermined weighting distribution 200. In this example image processing device, the determination of whether or not a given cell contains image information is made using the comparator 170 which compares the data levels of cells from the input buffer 110 against the threshold level, ref. If the data level of a cell is below the threshold, ref, then a content flag is set for this cell in content flag buffer 180. When the distributed-error calculator 150 is adjusting weights for a set of neighbor cells, to determine how to distribute quantization error to those cells, the distributed-error calculator 150 checks the flags in the content flag buffer 180 to determine whether any of the neighbor cells in the set contains no information.

In this example the distributed-error calculator 150 calculates the error components to be distributed to the neighbor cells in the vicinity of a target cell and outputs the distributed errors to the error accumulation buffer 160. The error accumulation buffer 160 accumulates, for different cells in the image, the error components that have been distributed to this cell. When a given cell becomes the target cell input to the adder 120, the error accumulation buffer 160 outputs the accumulated error for this cell to the adder 120 so that the target cell can be modified by an amount that corresponds to the accumulated error.

In the case of a cell which contains no image information, the error accumulation buffer 160 holds a zero value for error to be distributed to this cell. As a consequence, the adder 20 does not modify the data value for this cell. So, in this implementation also, the image processing device 100 of FIG. 8 only distributes quantization error to cells which have image content. Thus, in the case of a color line in the input image, quantization error is only propagated in the line direction.

Although certain examples of image processing methods and devices have been described, it is to be understood that changes and additions may be made to the described examples within the scope of the appended claims.

For instance, in the example image processing devices illustrated in FIGS. 6 and 7 the various component elements were implemented in hardware. However, it should be mentioned that the functions of the illustrated hardware components may be implemented using appropriate functional modules implemented in software and run by a processor.

The invention claimed is:

1. An image processing method transforming input multi-level image data into output image data having a smaller number of levels, wherein the input and output image data represent images formed of cells, the method comprising:
quantizing the input image data according to said smaller number of levels,
evaluating quantization error produced during the quantizing,
distributing the quantization error evaluated for a target cell of the image to a set of neighbor cells in the vicinity of the target cell, in proportions determined by a set of weights,
wherein the set of weights is determined by adjusting a predetermined weighting distribution which assigns predetermined weights to neighbour cells of said set according to their positions relative to the target cell, and the adjusting comprises reducing, below the predetermined value assigned to the corresponding cell position, the weights assigned to neighbor cells of said set whose data level is less than a threshold value;
wherein the distributing comprises adding parts of the quantization error evaluated for a target cell of the image to a set of neighbor cells in the vicinity of the target cell, in proportions determined by said set of weights;
the method further comprising reserving a fraction of the quantization error of the target cell, wherein the distributing the quantization error comprises distributing quantization error, excluding the reserved quantization error, to the neighbour cells in said set whose data level is no less than said threshold level, and there is further provided distributing the reserved quantization error to cells of said set of neighbor cells whose data level is less than the threshold value.

2. The image processing method of claim 1, wherein the distributing comprises subtracting parts of the quantization error from quantization levels used for quantizing said set of neighbor cells in the vicinity of the target cell, in proportions determined by said set of weights.

3. The image processing method of claim 1, wherein the input image data are contone data and the output image data are half-toned image data.

4. The image processing method of claim 1, wherein the set of neighbour cells comprises i neighbour cells, the predetermined weighting distribution assigns weights $w_i/\Sigma_i w_i$ to the i neighbour cells of said set according to their positions relative to the target cell, and the adjusting reduces the coefficient $w_k$ of the weight for a neighbour cell k of said set whose data level is less than the threshold value.

5. The image processing method of claim 4, wherein the adjusting sets to zero the coefficient $w_k$ of the weight for a neighbour cell k of said set whose data level is less than the threshold value.

6. The image processing method of claim 5, wherein the predetermined weighting distribution assigns weights $w_i/\Sigma_i w_i$ to the i neighbour cells of said set according to the Floyd-Steinberg algorithm.

7. The image processing method of claim 6, wherein the input multi-level image data is n-bit data and the threshold level is $2^{(n-4)}$.

8. A printing method comprising:
performing the image processing method of claim 1, and
printing image data that have been processed by said image processing method.

9. An image processor for a printer comprising:
an input to receive input multi-level image data representing images formed of cells,
a quantizer to quantize the input multi-level image data according to a lesser number of levels than the number representable in the input image data,
a quantization-error evaluator to evaluate quantization errors produced by the quantizer,
an error-distribution unit to:
reserve a fraction of the quantization error of the target cell, and
distribute the quantization error evaluated for a target cell of the image to a set of neighbor cells in the vicinity of the target cell, in proportions determined by a set of weights to produce half-toned data from the input image data, including:
distribution of quantization error, excluding the reserved quantization error, to the neighbour cells in the set whose data level is no less than a threshold level, and
distribution of the reserved quantization error to cells of the set of neighbor cells whose data level is less than the threshold value,
a weight-setting unit to produce said set of weights by adjusting a predetermined weighting distribution which assigns predetermined weights to neighbour cells of said set according to their positions relative to the target cell, wherein the adjusting comprises reducing, below the predetermined value assigned to the corresponding cell position, the weights assigned to neighbor cells of said set whose data level is less than a threshold value; and
an output to provide the resulting half-toned data to a print engine for printing of an image represented by the half-toned data.

10. The image processor of claim 9, wherein the error distribution unit comprises a distributed-error calculator to calculate errors to be distributed to the different neighbour cells of said set, and an adder to add distributed errors to image data of said neighbor cells.

11. The image processor of claim 9, wherein the error distribution unit comprises a distributed-error calculator to calculate errors to be distributed to the different neighbour cells of said set, and a subtractive adder to subtract the quantized cell value from a pre-quantization value and outputs the quantization error for the target cell.

12. A printer comprising the image processor of claim 9.

13. The printer of claim 12, wherein a separate processing path is defined for black image data.

14. A printer for printing a hardcopy image from contone data, the printer comprising:
a drop dispenser to selectively dispense a printing fluid on a print medium to form the hardcopy image; and
an image processor to control the drop dispenser based on the contone data, the image processor to:
quantize data for each pixel in the contone data, wherein the contone data has more levels than halftone data produced by the quantizing;
evaluate quantization error for each pixel produced during the quantizing,
reserve a fraction of the quantization error of the target cell, and
distribute the quantization error for each pixel to a set of neighbouring pixels in proportions determined by a set of weights, including:
comparing a level of the contone data for each neighbouring pixel to a threshold and reducing an amount of quantization error distributed to any neighbouring pixel with a level at or below the threshold;
adding parts of the quantization error evaluated for a target cell of the image to a set of neighbor cells in the vicinity of the target cell, in proportions determined by the set of weights;
distributing quantization error, excluding the reserved quantization error, to the neighbour cells in the set whose data level is no less than the threshold level, and
distributing the reserved quantization error to cells of the set of neighbor cells whose data level is less than the threshold value.

15. The printer of claim 14, wherein no amount of the quantization error is added to a neighbouring pixel with a level below the threshold.

16. The printer of claim 14, wherein the threshold is zero.

17. The printer of claim 14, the image processor to distribute the quantization error as recited in claim 14 only in a black color plane of the contone data.

18. The printer of claim 14, the image processor to distribute the quantization error as recited in claim 14 in all color planes of the contone data.

19. The printer of claim 14, the image processor to distribute the quantization error as recited in claim 14 in a sub-set of color planes of the contone data.

* * * * *

UNITED STATES PATENT AND TRADEMARK OFFICE
CERTIFICATE OF CORRECTION

PATENT NO. : 9,906,686 B2  
APPLICATION NO. : 15/028891  
DATED : February 27, 2018  
INVENTOR(S) : Sergio Puigardeu Aramendia et al.

Page 1 of 1

It is certified that error appears in the above-identified patent and that said Letters Patent is hereby corrected as shown below:

On the Title Page

Item (72), Inventors, in Column 1, Line 4, after "Luis Garcia" insert -- Garcia --.

Signed and Sealed this  
Nineteenth Day of June, 2018

Andrei Iancu  
*Director of the United States Patent and Trademark Office*